US009288159B2

(12) United States Patent
Hutt et al.

(10) Patent No.: US 9,288,159 B2
(45) Date of Patent: Mar. 15, 2016

(54) SYSTEMS AND METHODS FOR DEEP PACKET INSPECTION WITH A VIRTUAL MACHINE

(71) Applicant: Marvell World Trade Ltd., St Michael (BB)

(72) Inventors: Gad Hutt, Sunnyvale, CA (US); Michael Orr, Sunnyvale, CA (US); Ronen Tausi, Raanana (IL); Vitaly Vovnoboy, Karney Shomron (IL)

(73) Assignee: Marvell World Trade Ltd., St. Michael (BB)

( * ) Notice: Subject to any disclaimer, the term of this patent is extended or adjusted under 35 U.S.C. 154(b) by 148 days.

(21) Appl. No.: 13/957,990

(22) Filed: Aug. 2, 2013

(65) Prior Publication Data

US 2014/0036921 A1    Feb. 6, 2014

Related U.S. Application Data

(60) Provisional application No. 61/679,361, filed on Aug. 3, 2012.

(51) Int. Cl.
*H04L 12/28* (2006.01)
*H04L 12/947* (2013.01)
*H04L 12/26* (2006.01)

(52) U.S. Cl.
CPC ............. *H04L 49/25* (2013.01); *H04L 43/028* (2013.01); *H04L 43/12* (2013.01)

(58) Field of Classification Search
USPC .......................................... 370/292, 235, 388
See application file for complete search history.

(56) References Cited

U.S. PATENT DOCUMENTS

| 2007/0058632 | A1 | 3/2007 | Back et al. |
| 2010/0088670 | A1 | 4/2010 | Paster |
| 2010/0103837 | A1 | 4/2010 | Jungck et al. |
| 2011/0113472 | A1* | 5/2011 | Fung et al. .......................... 726/3 |

FOREIGN PATENT DOCUMENTS

| WO | 2006034023 | 3/2006 |
| WO | 2011106588 | 9/2011 |
| WO | WO 2013032473 A1 * | 3/2013 |

OTHER PUBLICATIONS

International Search Report and Written Opinion issued Feb. 20, 2014 in related/corresponding PCT Patent Application No. PCT/IB2013/002156 filed Aug. 2, 2013.

* cited by examiner

*Primary Examiner* — Zewdu A Beyen

(57) ABSTRACT

System and methods are provided for performing deep packet inspection of data packets. An example system includes a packet forwarding component and a virtual machine component. The packet forwarding component is configured to receive data packets for transmission and to select one or more of the data packets based at least in part on a first set of rules for deep packet inspection. The virtual machine component is configured to perform deep packet inspection on the selected data packets according to a second set of rules to determine whether the selected data packets are allowed for transmission. The packet forwarding component is further configured to transmit the selected data packets when the selected data packets are allowed for transmission after the deep packet inspection.

15 Claims, 4 Drawing Sheets

SYSTEMS AND METHODS FOR DEEP PACKET INSPECTION WITH A VIRTUAL MACHINE

CROSS-REFERENCE TO RELATED APPLICATIONS

This disclosure claims priority to and benefit from U.S. Provisional Patent Application No. 61/679,361, filed on Aug. 3, 2012, the entirety of which is incorporated herein by reference.

FIELD

The technology described in this patent document relates generally to communication systems and more particularly to deep packet inspection in communication systems.

BACKGROUND

Deep packet inspection (DPI) has been implemented in many communication systems for detecting protocol non-compliance, viruses, spam, intrusions, or for determining, based on defined criteria, whether certain data packets in network traffic may pass or if the data packets need to be routed, to a different destination, etc. Network traffic usually includes data packets of certain internet protocols transmitted between different network entities. Usually. DPI not only inspects the header portion of a data packet which often includes information related to the protocol, source and destination IP addresses and ports, but also can the pa load portion of the data packet which often includes user data to he transmitted.

Oftentimes, a DPI system may identify data packets from different applications/network entities using certain search algorithms, such as signature analyses. For example, a signature of a particular application/network entity includes a unique pattern (e.g., bytes/characters/string). A reference database may be created based on analyses of signatures of various applications/network entities. A classification engine of the DPI system may then compare data packets from the network traffic against this reference database to identify the exact applications/network entities. The reference database may be updated periodically to keep current with new applications/network entities as well as new developments of protocols associated with the existing applications/network entities.

Hardware implementation of DPI is often adopted to achieve good processing speed. For example, content addressable memories (CAM) are used in DPI systems. A CAM may make parallel comparisons between entries stored in the CAM and certain input values of the data packets in the network traffic and return the memory address of the matched entry. For example, a binary CAM is a simple type of CAM which often stores search words including two matching states, "1" and "0." A ternary CAM (TCAM) allows a third matching state of "X" or "Don't Care" for one or more bits in the stored search words, thus adding flexibility to the search. As an example, a ternary CAM might have a stored search word of "1XX10" which can match any of the four words "10010," "10110," "11010," or "11110." This added search flexibility comes at an additional cost over a binary CAM as the internal memory cell needs to encode three states instead of two.

SUMMARY

In accordance with the teachings described herein, system and methods are provided for performing deep packet inspection of data packets. An example system includes a packet forwarding component and a virtual machine component. The packet forwarding component is configured to receive data packets for transmission and to select one or more of the data packets based at least in part on a first set of rules for deep packet inspection. The virtual machine component is configured to perform deep packet inspection on the selected data packets according to a second set of rules to determine whether the selected data packets are allowed for transmission. The packet forwarding component is further configured to transmit the selected data packets when the selected data packets are allowed for transmission after the deep packet inspection.

In one embodiment, a method for performing deep packet inspection of data packets includes, receiving data packets for transmission, selecting one or more of the data packets based at least in part on a first set of rules for deep packet inspection, performing deep packet inspection on the selected data packets according to a second set of rules to determine whether the selected data packets are allowed for transmission, and transmitting the selected data packets when the selected data packets are allowed for transmission after the deep packet inspection.

In another embodiment, a processing system for performing deep packet inspection of data packets includes one or more data processors configured to implement a virtual machine. The virtual machine is configured to receive one or more data packets from a switch core and perform deep packet inspection on the received data packets according, to a first set of rules to determine whether the received data packets are allowed for transmission. The virtual machine is further configured to cause the received data packets to be transmitted by the switch core when the data packets are allowed for transmission after the deep packet inspection.

DETAILED DESCRIPTION

A hardware implementation of DPI, such as a CAM (e.g., a binary CAM or a TCAM), may have some disadvantages under certain circumstances. For example, data packets of real-time transport protocol (RTP) each include a header, optional header extensions, and a payload portion. Usually, RTP data packets from different applications/network entities vary in length and structure. Thus, in order to discern the RTP data packets from different sources, a lot of entries may be stored in the CAM (e.g., a binary CAM or a TCAM), which may result in significantly high system costs.

Figure 1:
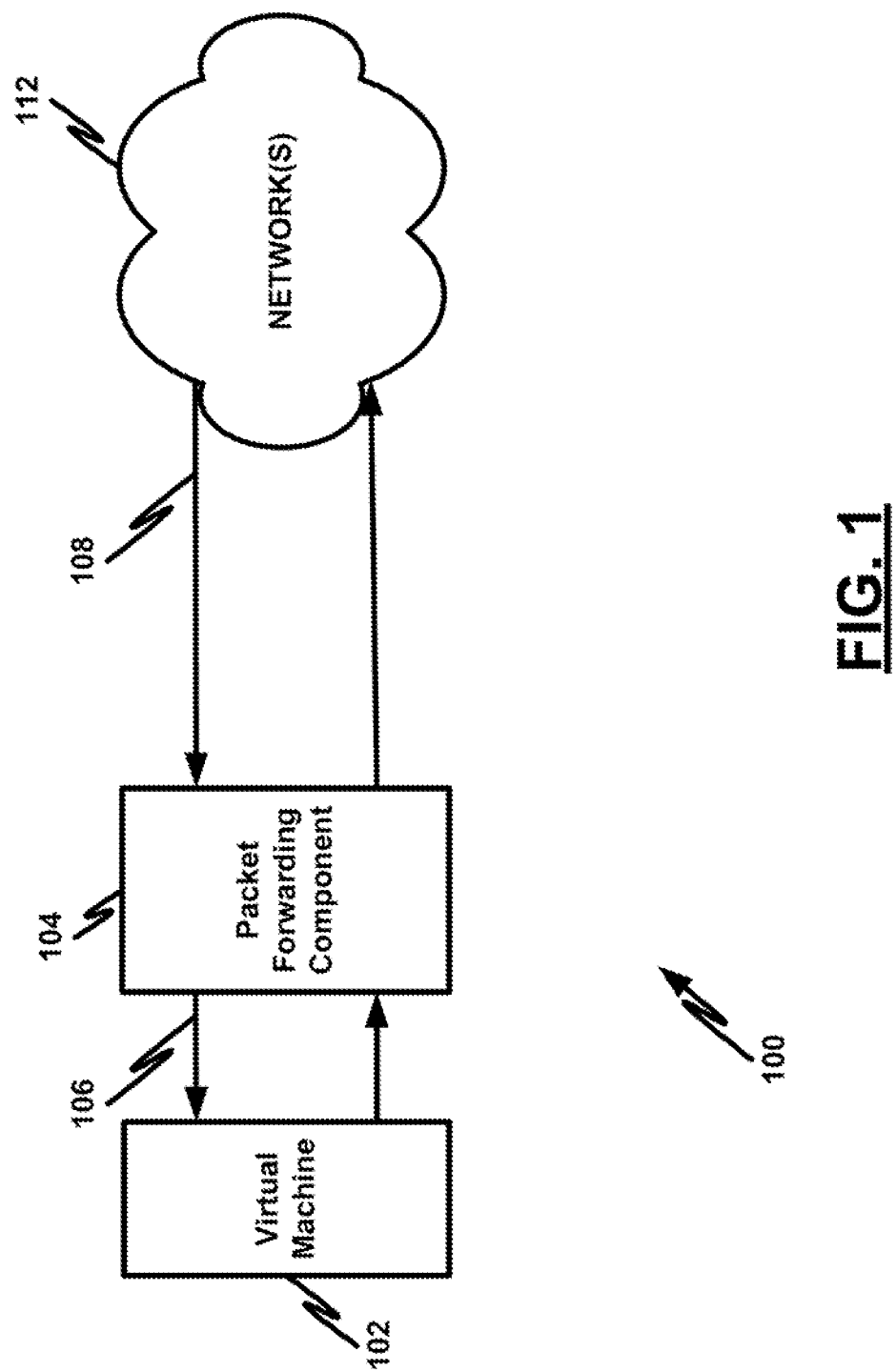
FIG. 1 depicts an example diagram for performing deep packet inspection on data packets from network traffic.

FIG. 1 depicts an example diagram for performing deep packet inspection on data packets from network traffic. As shown in FIG. 1, a packet forwarding component 104 (e.g., implemented in a switch or other gateway devices) performs preliminary inspection of data packets 108 received from a network 112, and selects one or more data packets for deep packet inspection by a virtual machine 102 (e.g., implemented in one or more data processors). The virtual machine 102 has the flexibility to perform deep packet inspection at any depth of the data packets according to one or more predetermined rules. In some embodiments, the virtual machine 102 corresponds to a virtual implementation of one or more processor elements which are dedicated to performing deep packet inspection. The virtual machine 102 is "virtual" because, to an observer, it appears to be part of the underlying, hardware and the way it is implemented is not apparent.

Specifically, the packet forwarding component 104 inspects the data packets 108 and selects one or more of the data packets 108 for deep packet inspection based on a set of rules. For example, the packet forwarding component 104 inspects a predetermined sequence of bits at a predetermined offset of each of the data packets 108, and identifies one or more of the data packets 108 in need of deep packet inspection. The virtual machine 102 may be programmed to inspect the selected data packets 106 according to another set of rules to determine whether the selected data packets 106 are allowed for transmission. For example, the virtual machine 102 may inspect any predetermined sequence of bits at any particular depth for each of the selected data packets 106.

When the virtual machine 102 determines the selected data packets 106 are suitable for transmission, the packet forwarding component 104 may be configured to transmit the selected. data packets 106 to their respective destinations, e.g., through the network 112. If the selected data packets 106 are not allowed to he transmitted, then the packet forwarding component 104 may take proper measures, such as discarding/quarantining/rerouting these data packets.

Figure 2:
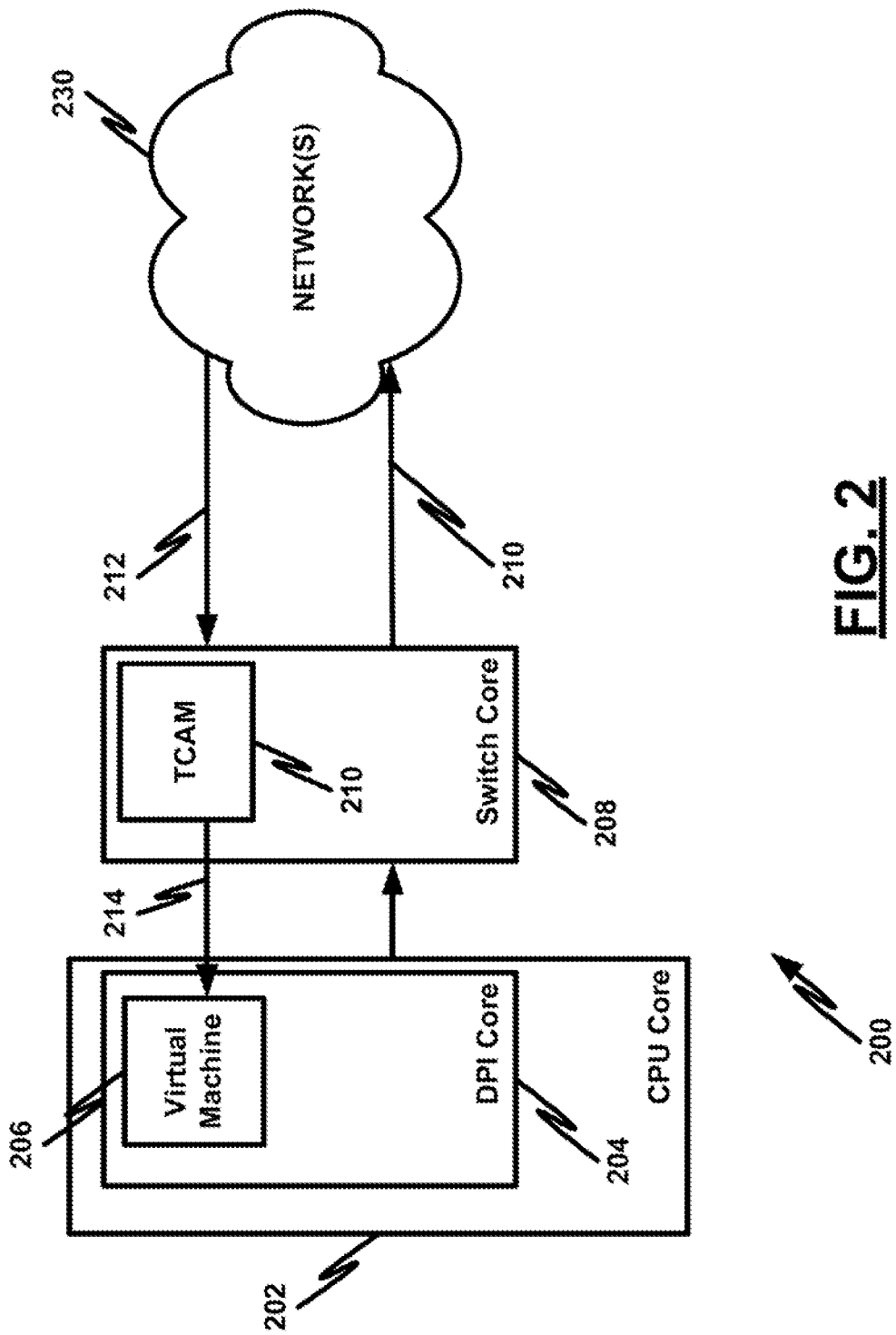
FIG. 2 depicts an example diagram for performing deep packet inspection on data packets using a virtual machine implemented in a DPI core.

FIG. 2 depicts an example diagram for performing deep packet inspection on data packets using a virtual machine implemented in a DPI core. As shown in FIG. 2, a virtual machine 206 within a DPI core 204 is used for performing, deep packet inspection on data packets forwarded from a TCAM 210 within a switch core 208.

Specifically, the TCAM 210 inspects a predetermined sequence of bits at a predetermined offset of each of the data packets 212 received from a network 230. For example, an RTP data packet may usually be identified by inspecting the first 128 bits which typically includes a header portion or any optional header extensions. The TCAM 210 may be programmed to inspect the first 128 bits of each of the data packets 212 to identify the RTP data packets, and to send all identified RIP data packets to the virtual machine 206 for deep packet inspection.

The DPI core 204 is part of a central-processing-unit (CPU) core 202 which implements one or more data processors. The virtual machine 206 may inspect data packets 214 forwarded from the TCAM 210, and determine whether the data packets 214 are suitable for transmission. Further, the virtual machine 206 may use a direct matching algorithm (e.g., identical suing matching) or a pattern matching algorithm (e.g., approximate string matching). When the virtual machine 206 determines that the data packets 214 are allowed for transmission, the data packets 214 may be assigned to a particular process queue of the switch core 208 for transmission.

Figure 3:
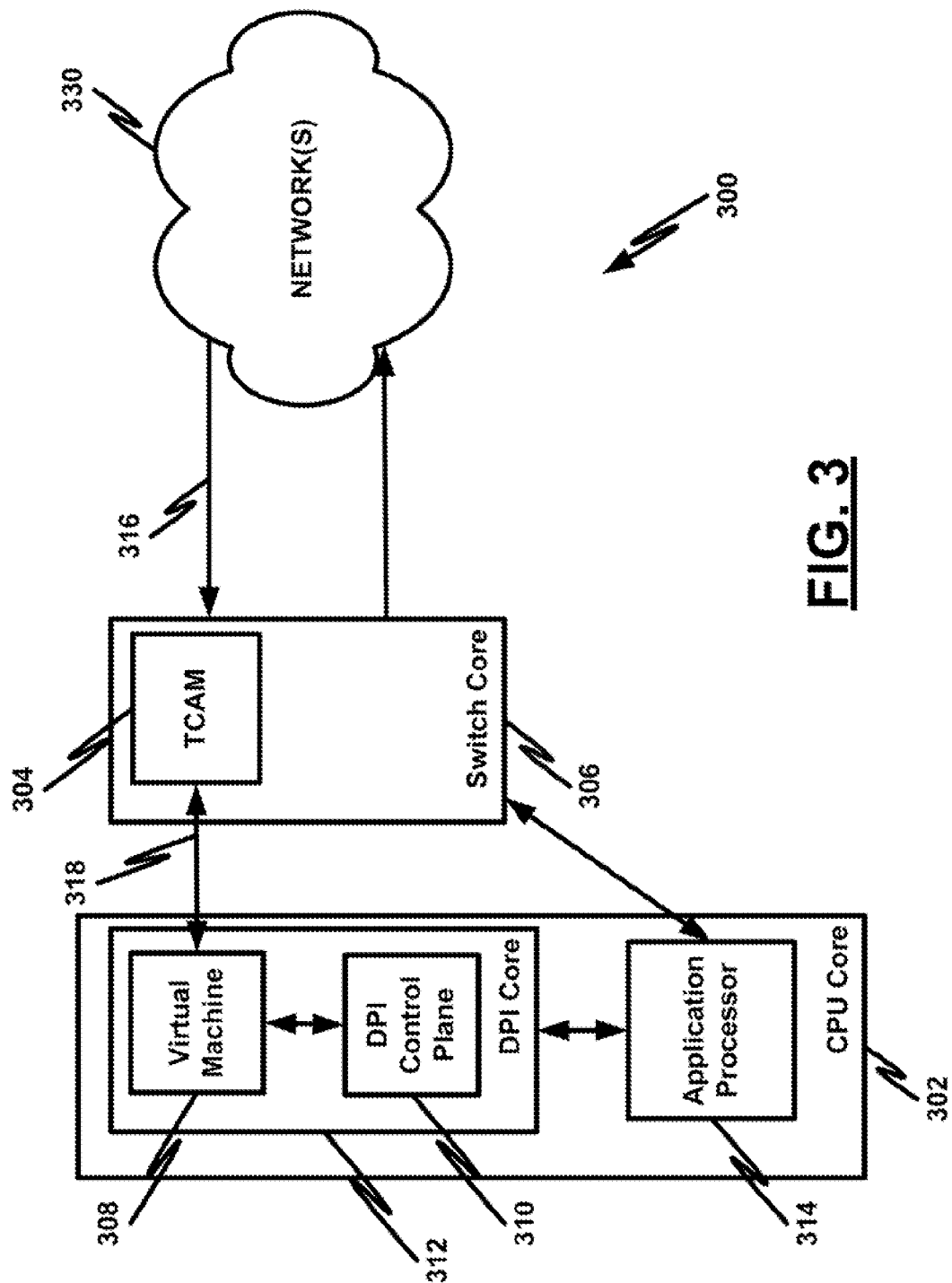
FIG. 3 depicts another example diagram for performing deep packet inspection on data packets using a virtual machine implemented in a DPI core.

FIG. 3 depicts another example diagram for performing deep packet inspection on data packets using a virtual machine implemented in a DPI core. As shown in FIG. 3, a TCAM 304 within a switch core 306 forwards one or more data packets to a virtual machine 308 within a DPI core 312 for deep packet inspection.

The DPI core 312 resides in a CPU core 302, and further includes a DPI control plane 310 which provides configuration information e.g., the rules for deep packet inspection) to the virtual machine 308, in addition, the DPI control plane 310 may receive information related to deep-packet-inspection events from the virtual machine 308. For example, when the virtual machine 308 determines that the data packets 318 from the TCAM 304 is suitable for transmission, the DPI control plane 310 may receive a command from the virtual machine 308 to perform certain actions in order to cause the switch core 306 to transmit the data packets 318, The CPU core 302 further includes an application processor 314 which provides configuration information (e.g., process queues and associated queue numbers) to the switch core 306 and receives information related to hardware events system calls) from the switch core 306. In addition, the application processor 314 may process data packets which are not forwarded to the DPI core 312. For example, the application processor 314 may inspect the header portion or a header extension of the received data packets.

Figure 4:
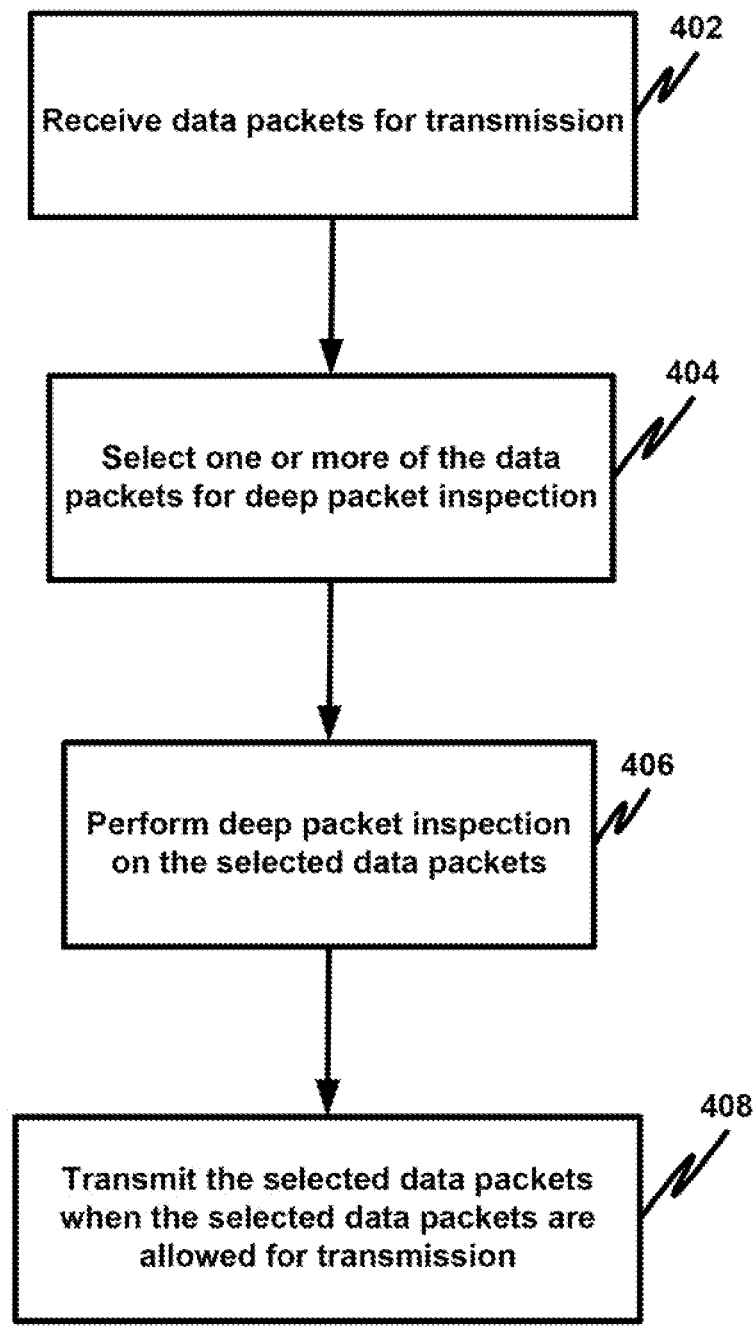
FIG. 4 depicts an example flow diagram for deep packet inspection using a virtual machine.

The virtual machine 308 may perform deep packet inspection using, different methods. For example, the virtual machine 308 may inspect the payload of data packets to locate certain embedded patterns (e.g., bytes/characters/strings) even though these embedded patterns may not be located at a specific deterministic offset. As another example, the virtual machine 308 may look into the numerical characteristics of data packets, such as the payload size, the number of response packets, and offsets, to determine whether the data packets are suitable for transmission. In addition, the virtual machine 308 may perform behavioral and statistical (heuristic) analyses of the data packets to identify viruses or analyze network traffic. Further, the virtual machine 308 may analyze a number of consecutive data packets to discern a certain sequence of steps or actions related to a particular application/network entity, FIG. 4 depicts an example flow diagram for deep packet inspection using, a virtual machine. At 402, data packets are received for transmission. At 404, one or more of the data packets are selected, e.g., based at least in part on a first set of rules for deep packet inspection. At 406, deep packet inspection is performed on the selected data packets, e.g., by a virtual machine, according to a second set of rules to determine whether the selected data packets are allowed for transmission. In one implementation, the second set of rules is different from the first set of rules. Then, at 408, the selected data packets are transmitted when the selected data packets are allowed for transmission after the deep packet inspection.

This written description uses examples to disclose the invention, include the best mode, and also to enable a person skilled in the an to make and use the invention, The patentable scope of the invention may include other examples that occur to those skilled in the art.

For example, the systems and methods described herein may be implemented on many different types of processing systems by program code comprising program instructions that are executable by the system. processing subsystem. Other implementations may also be used, however, such as firmware or appropriately designed hardware configured to carry out the methods and systems described herein. For example, the systems and methods described herein may be implemented in a stateful operation mode or a stateless operation mode. In another example, the systems and methods described herein may be implemented for network traffic analyses using behavioral algorithms. In yet another example, the systems and methods described herein may be implemented to build flexible DPI engines fully programmable with hardware-assist capturing, engines, in yet another example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

What is claimed is:

1. A system for performing deep packet inspection of data packets, the system comprising at least one processor configured to:
- receive a plurality of data packets to be forwarded; and
- select one or more of the plurality of data packets based at least in part on a first set of rules for deep packet inspection, by inspecting a predetermined sequence of bits at a predetermined offset of each of the plurality of data packets;
- perform deep packet inspection on the selected one or more data packets to determine whether the selected one or more data packets are allowed for forwarding, according to a second set of rules that are based on
  - (i) characters in the selected one or more data packets matching a predetermined pattern,
  - (ii) strings in the selected one or more data packets matching a predetermined pattern,
  - (iii) cardinality of a group consisting of the selected one or more data packets, wherein the cardinality represents how many packets are in the group,
  - (iv) behavioral and statistical analyses of the selected one or more data packets to identify a virus or analyze network traffic, and
  - (v) existence, from among the selected one or more data packets, a plurality of consecutive data packets that together contain a particular sequence of actions that indicates a particular application or network entity;
- discard the selected one or more data packets in response to determining, based on the deep packet inspection, that the selected one or more data packets are not allowed for forwarding;
- forward the selected one or more data packets in response to determining, based on the deep packet inspection, that the selected data packets are allowed for forwarding; and
- wherein the receiving, the selecting, the discarding and the forwarding are performed by a packet forwarding component; and
- wherein the deep packet inspection is performed by a virtual machine component.

2. The system of claim 1, wherein the virtual machine component is configured to determine whether the selected data packets are allowed for forwarding by inspecting a particular sequence of bits of each of the selected data packets.

3. The system of claim 1, wherein the virtual machine component is included in a deep-packet-inspection core, and wherein the packet forwarding component is included in a switch core.

4. The system of claim 3, wherein the deep-packet-inspection core is included in a central-processing-unit core, and wherein the central-processing-unit core further includes an application processor configured to (i) receive information related to hardware events from the switch core, and (ii) output information related to configuration of the switch core.

5. The system of claim 1, wherein the deep-packet-inspection core further includes a deep-packet-inspection control plane configured to (i) receive information related to deep-packet-inspection events from the virtual machine component, and (ii) output information related to configuration of the virtual machine component.

6. A method for performing deep packet inspection of data packets, the method comprising:
- receiving a plurality of data packets to be forwarded;
- selecting, based at least in part on a first set of rules, one or more of the plurality of data packets for deep packet inspection, by inspecting a predetermined sequence of bits at a predetermined offset of each of the plurality of data packets;
- performing deep packet inspection on the selected one or more data packets to determine whether the selected one or more data packets are allowed for forwarding, according to a second set of rules that are based on
  - (i) characters in the selected one or more data packets matching a predetermined pattern,
  - (ii) strings in the selected one or more data packets matching a predetermined pattern,
  - (iii) cardinality of a group consisting of the selected one or more data packets, wherein the cardinality represents how many packets are in the group,
  - (iv) behavioral and statistical analyses of the selected one or more data packets to identify a virus or analyze network traffic, and
  - (v) existence, from among the selected one or more data packets, a plurality of consecutive data packets that together contain a particular sequence of actions that indicates a particular application or network entity;
- discarding the selected one or more data packets in response to determining if the deep packet inspection determines that the selected one or more data packets are not allowed for forwarding; and
- forwarding the selected one or more data packets if the deep packet inspection determines that the selected one or more data packets are allowed for forwarding.

7. The method of claim 6, wherein performing, according to a second set of rules, deep packet inspection on the selected data packets to determine whether the selected data packets are allowed for forwarding includes:
- inspecting a particular sequence of bits of each of the selected data packets.

8. The method of claim 6, further comprising:
- receiving information related to hardware events from a switch core, the switch core selecting, based at least in part on the first set of rules, one or more of the data packets for deep packet inspection; and outputting information related to configuration of the switch core.

9. The method of claim 6, further comprising:
- receiving information related to deep-packet-inspection events from a virtual machine, the virtual machine performing the deep packet inspection; and
- outputting information related to configuration of the virtual machine.

10. A processing system for performing deep packet inspection of data packets, the processing system comprising:
- one or more data processors configure to implement a virtual machine that is configured to
  - receive, from a switch core, one or more data packets to be forwarded, and
  - perform deep packet inspection on the one or more data packets to determine whether the one or more data packets are allowed for forwarding, according to a set of rules that are based on
    - (i) characters in the one or more data packets matching a predetermined pattern,
    - (ii) strings in the one or more data packets matching a predetermined pattern, (iii) cardinality of a group consisting of the selected one or more data packets, wherein the cardinality represents how many packets are in the group,
(iv) behavioral and statistical analyses of the one or more data packets to identify a virus or analyze network traffic, and
(v) existence, from among the one or more data packets, a plurality of consecutive data packets that together contain a particular sequence of actions that indicates a particular application or network entity;

discard the one or more data packets in response to the virtual machine determining, based on the deep packet inspection, that the received one or more data packets are not allowed for forwarding; and cause the received one or more data packets to be forwarded by the switch core in response to the virtual machine core determining, based on the deep packet inspection, that the one or more data packets are allowed for forwarding.

11. The processing system of claim 10, wherein the virtual machine is configured to perform the deep packet inspection on the received data packets by inspecting a particular sequence of bits of each of the received data packets.

12. The processing system of claim 10, wherein the switch core is configured to select, based at least in part on a second set of rules, the one or more data packets from a data stream for deep packet inspection.

13. The processing system of claim 12, where the switch core is configured to select, based at least in part on the second set of rules, the one or more data packets by inspecting a predetermined sequence of bits at a predetermined offset of each of the data packets.

14. The processing system of claim 10, wherein the one or more data processors are further configured to implement an application processor, and wherein the application processor is configured to (i) receive information related to hardware events from the switch core, and (ii) output information related to configuration of the switch core.

15. The processing system of claim 10, wherein the one or more data processors are further configured to (i) receive information related to deep-packet-inspection events from the virtual machine, and (ii) output information related to configuration of the virtual machine.

* * * * *